June 14, 1938. W. B. CLIFFORD 2,120,929
THERMOSTATIC UNIT
Filed March 18, 1935
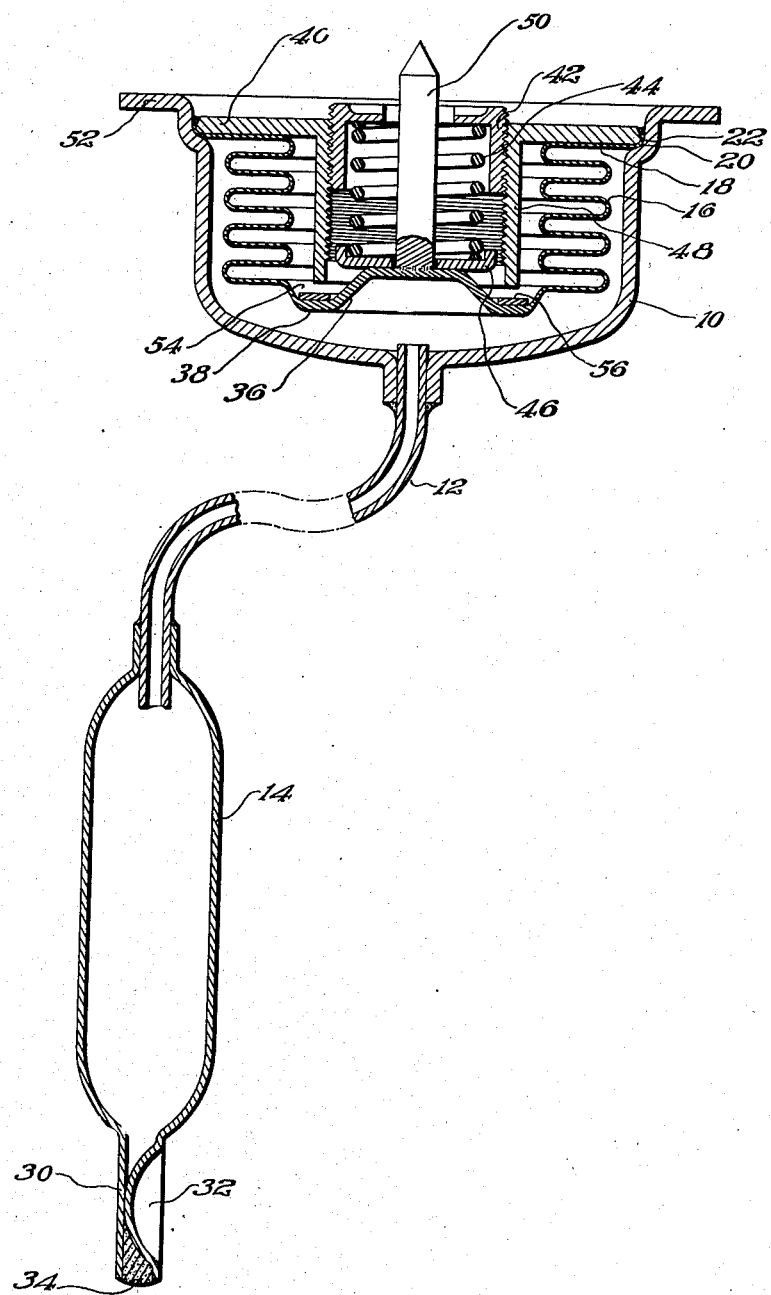

Patented June 14, 1938

2,120,929

UNITED STATES PATENT OFFICE 2,120,929

THERMOSTATIC UNIT

Walter B. Clifford, Boston, Mass., assignor to Clifford Manufacturing Co., Boston, Mass., a corporation of Delaware Application March 18, 1935, Serial No. 11,564

3 Claims. (Cl. 297—3)

The present invention relates to thermostatic units, and more particularly to self-contained units of this character designed for attachment to a switch, valve or the like which is to be controlled thermostatically.

In the operation of electric refrigerators, oven controls and other units of this general character, a thermostatic unit which comprises a bellows with attached capillary to provide a sealed expansible space responsive to the thermostatic fluid contained therein has many desirable attributes. The capillary at its end remote from the bellows may or may not be provided with a bulb-shaped reservoir, and the bellows may or may not be enclosed within a surrounding housing. In either case, the operation of the unit is the same, namely, the bellows is caused to expand and contract in reflection of the temperature within which the capillary, or more particularly the bulb, is located, providing a remote control and permitting the location of the switch or valve which is connected with the bellows wherever it may be desired in the design of the refrigerator, oven or the like.

Frequently these units, particularly if designed for refrigerator work, are filled with a thermostatic fluid which develops a substantial vapor pressure at room temperature, and the unit itself must be protected against distortion or over-stressing of the bellows due to pressures which may be encountered internally of the unit during manufacture, shipping and handling prior to its permanent installation in connection with the switch or valve.

It is furthermore desirable that these units shall be completely self-contained in the sense that not only the expansible or contractible bellows with its operating member be capable of ready attachment to the switch, but in addition the loading spring which opposes the vapor pressure, if it can be embodied within the thermostatic unit and forming a part thereof, effects a marked saving in space in the switch or valve mechanism itself.

The purpose of the present invention is to design a completely self-contained thermostatic unit which is capable of withstanding whatever abnormal temperatures it may encounter in shipment and handling without over-stress of the bellows wall, and which contains all of the operating appurtenances including the loading spring self-contained within the unit in such a manner as to permit attachment of the unit directly to the switch mechanism without modification, and with the requirement of a minimum number of parts in the switch mechanism itself.

With this and other objects in view, I have devised the unit shown in sectional elevation in the drawing, which embodies many desirable features and which represents the preferred form of such a self-contained unit.

In this embodiment of the invention as illustrated in the drawing, it will be noted that the assembly as a whole comprises essentially a cup-like housing 10, sufficiently strong and rigid to be inflexible, having attached at its closed end a capillary tube 12 which is provided at its end remote from the cup with an enlarged bulb 14. A cup-like bellows unit 16 is received within the housing 10, and is connected to the housing at the open end through an integral and generally radial flange 18 which is seated within a circumferential recess 20 formed adjacent the rim of the housing. The radial flange 18 may have an outwardly and axially directed portion 22, which causes the flange to conform generally to the recess in the housing. By properly bonding the flange to the housing, as by solder or otherwise, the annular space between the bellows and housing is sealed, and in conjunction with the capillary and bulb presents an expansible chamber of any desired length which may be filled with thermostatic fluid. As a rule, the fluid employed is capable of developing a substantial vapor pressure throughout the temperature range for which the unit is designed, and is completely evacuated of air and all foreign materials before filling. This is accomplished by connecting the reduced extended end 30 of the bulb to a vacuum source, completely exhausting the interior of the unit, filling with the desired thermostatic fluid, generally in the form of a gas, and thereafter pinching off the extended end at 32 and sealing with solder or the like at 34.

During the filling of the unit and the maintenance of a vacuum in the annular space between the bellows and housing, the inward movement of the movable end wall 36 of the bellows is limited by engagement of the depressed portion 38 with the adjacent portion of the housing wall. The open end of the housing 10 is provided with a closure 40 of circular outline, seated in the recess 20 above the bellows and connected to the housing through the joint which seals the bellows thereto. This transverse closure member is provided with a central opening, and has threaded therein a spring abutment 42, which sustains the outward thrust of a loading spring 44 interposed between the abutment and a spring seat 46 mounted on the movable end wall of the bellows. Proper adjustment of the abutment 42 serves to impart the necessary spring load to oppose the vapor pressure generated for moving the end wall of the bellows. Outward movement of the end wall 36 is confined and limited by a tubular stop member 48, which in the illustrated embodiment of the invention actually projects inwardly from and is a part of the closure 40, this stop member being threaded internally and constituting the threaded support for the abutment.

It will be observed that with this construction the limiting stop 48 is supported rigidly from the housing, and forms a fixed and definite limit to control outward movement of the end wall, the latter moving within limits controlled by the stop 48 and adjacent wall of the housing.

Mounted upon the end wall and projecting outwardly beyond the housing is an operating pin 50, which is welded to the end wall at its base without requiring piercing of the wall, and which is appropriately shaped at its outer end to engage the switch or the like to be operated. It will be observed that with this construction the loading spring may be adjusted through manipulation of the abutment to apply any appropriate load to the end wall in opposition to the vapor pressure load after filling and sealing of the unit. Furthermore, in the normal relationship of the parts, all of the operating parts of the unit are enclosed in a space encompassed by the housing 10 and the plane of the attaching flange 52, this attaching flange being drilled or otherwise to provide for attachment to the surface of a switch housing or the like.

The construction, due to its compact and self-contained characteristics, lends itself admirably to convenient attachment to a simple form of switch housing which does not require the usual type of loading spring heretofore employed and requiring a larger and more cumbersome form of switch mechanism.

It is desirable to immerse the unit in a plating bath or the like after completion, and to make this possible without likelihood of plating fluid reaching the bellows folds and eventually causing corrosion, the movable end wall is provided in the circumferential recess 54 with a sealing disk 56 of compressible and preferably non-metallic material, designed to engage with the lower arm of the stop tube 48 on the development of vapor pressure sufficient to move the end wall outwardly. In this position any plating fluid or the like which may enter into the spring chamber is not allowed to pass beyond the interior of the stop tube and outwardly into the bellows folds. Inasmuch as sufficient vapor pressure is ordinarily developed at room temperatures or higher to provide a tight seal particularly in the elevated temperature of the plating bath, no special adjustment of the loading spring is required, nor does it normally interfere with the sealing function at room temperatures.

What is claimed is:

1. A thermostatic unit comprising a cup-like housing having an attaching flange at the rim, a cup-like bellows received in the housing and connected thereto adjacent the rim of the housing to provide an annular sealed space therebetween, thermostatic fluid filling the space, the bellows having a movable end wall, a closure member for the open end of the housing having a central tubular portion which projects lengthwise of the bellows and interiorly thereof, the tubular portion serving to limit outward movement of the end wall, means for sealing the space about the tubular projection upon outward movement of the end wall, an abutment adjustably supported in the tubular portion of the closure, a loading spring within the tubular extension and interposed between the abutment and movable end wall, and an operating pin secured to the end wall and extending within the tubular portion lengthwise of the bellows and beyond the plane of the attaching flange.

2. A thermostatic unit comprising a cup-like housing, a bellows cup received within the housing and attached thereto at the open end to provide a sealed annular space therebetween, thermostatic fluid filling the space, a movable end wall for the bellows, a closure for the open end of the housing having a tubular extension extending inwardly therefrom within the bellows to provide a stop for limiting outward movement of the end wall, a loading spring received within the tubular extension, an adjustable abutment engaging the outer end of the spring and threaded in the tubular extension, and an operating member extending lengthwise of the spring and projecting outwardly beyond the closure.

3. A thermostatic unit comprising a cup-like housing having an attaching flange at the rim, a bellows cup received within the housing having a radial attaching flange connected to the housing adjacent the rim to provide a sealed annular space therebetween, thermostatic fluid filling the space, a rigid closure connected to the housing beyond the bellows and supporting the radial flange, the closure having a tubular and inwardly extending projection to form a hollow chamber centrally thereof, the projection at its inner end serving as a stop to limit outward movement of the end wall, an operating pin connected to the end wall extending lengthwise of the bellows to a point beyond the rim of the housing, a loading spring received in the chamber formed by the extension and resisting outward movement of the end wall, and an abutment adjustably connected to the closure and engaging the spring to sustain the thrust of the spring, the abutment having a passage for the free movement of the operating member therethrough.

WALTER B. CLIFFORD.